United States Patent Office 3,082,089
Patented Mar. 19, 1963

3,082,089
PROCESS FOR PREPARING ALCOHOLIC BEVERAGE
Noboru Miyachi, Tokyo, Japan, assignor to Sanraku Shuzo Kabushiki Kaisha, Tokyo, Japan, a corporation of Japan
No Drawing. Filed June 3, 1960, Ser. No. 33,641
6 Claims. (Cl. 99—48)

The present invention relates to a process for preparing alcoholic beverages which is characterized by the use of kojic acid as an antioxidant for the prevention of beverages from deteriorating in flavour which often occurs in natural alcoholic beverages in general when certain time has passed after their fermentation.

It is quite common that fermented beverages such as Japanese sake, wine, cider, beer, and more particularly, synthesized beverages composed by blend of a natural fermented beverage with a synthesized beverage undergo, after a certain length of time has passed, a deterioration of flavour, resulting in a flavour completely different from the original one with which they were initially invested. It is also well known that such deterioration of flavour in alcoholic beverages arises from a rise of oxidation-reduction potential; i.e. an excessive oxidation of the alcoholic beverage. So, in order to prevent such oxidation of alcoholic beverages, several antioxidants (isoamyl gallate, propyl gallate, butyrated hydroxyanisol, butyrated hydroxytoluene) have been used to prevent such oxidation.

In the course of a series of experiments in search for an effective antioxidant that might be much more effective than those already known the inventor discovered that kojic acid which has not been known to be used as an antioxidant of alcoholic beverages well suited such antioxidizing purposes; and hence has extended his researches about this specific acid into the present invention.

Kojic acid is a compound which was initially discovered as a new compound by S. Yabuta in 1907 as a product of *Aspergillus oryzae*, and its structure was clarified in 1925. Its uses as known to date have been limited solely to application as an intermediate in the preparation of insesticides or as a chelating agent of metals. No example, or the least hint either, of using this particular acid as an antioxidant has been known.

The antioxidant use of kojic acid as carried out in research experiments performed by the applicant showed a decisive superiority of this acid over all the other known antioxidants as was substantiated by the results of a number of comparative tests conducted, in which kojic acid always minimized the rise of the indicator time test (ITT) value and kept the oxidation-reduction potential low, and preserved the original flavour. In the following table in which the experimental results are shown, the effectiveness of kojic acid can be seen as compared with that of other known antioxidants.

TABLE I

*Effect of Various Antioxidants in Alcoholic Beverage*

| Antioxidant | Number of days after mixing | | | | | | | | Evaluated by tasting | Order |
| --- | --- | --- | --- | --- | --- | --- | --- | --- | --- | --- |
| | 0 | 1 | 2 | 4 | 8 | 17 | 29 | 51 | 83 | | |
| | Indicator time test (ITT) value (min.) | | | | | | | | | | |
| Isoamyl gallate | 19 | 19 | 16 | 13 | 12 | 10 | 17 | 12 | 40 | Relatively good | 2 |
| Propyl gallate | 24 | 56 | 65 | 52 | 69 | 100 | 110 | 121 | 143 | Resulted in turbidity | 3 |
| B. H. A.[1] | 85 | 80 | 91 | 102 | 110 | 115 | 122 | 125 | 120 | | 4 |
| B. H. T.[1] | 14 | 20 | 29 | 41 | 96 | 135 | 161 | 180 | 189 | | 5 |
| Kojic acid | 13 | 11 | 6 | 5 | 8 | 16 | 20 | 20 | 20 | Flavor was most fragrant | 1 |
| Control, no antioxidant added | 201 | 209 | 218 | 230 | 245 | 249 | 250 | 263 | 275 | Worst odor, deteriorated in five days | 6 |

[1] B. H. A. refers to butylated hydroxy anisole, and B. H. T. refers to butylated hydroxy toluene.

NOTE.—(1) The above data refer to the results of measurements made of the ITT value and evaluation of flavour and taste by tasting at regular intervals after mixing. The material used as sample is a blend of a synthesized wine (A) and a must (B). A few days prior to their mixing, the antioxidants were added in such amounts that the final concentration would be 0.011%, and then, 10% of the must (B) was blended. The synthesized wine (A) is a purely 100% synthetic preparation of various ingredients such as, alcohol, sugars, tartaric acid, tannin and various seasonings, etc. The must (B) is a new natural fermented wine made from the Koshu species of Japanese grape, and fresh from filtration.

NOTE.—(2) The ITT value is expressed in length of time in minute, which is required for the decoloration of 2,6 dichlorophenolindophenol by 20%, and this latter is well known as a dye sensitive to oxidation-reduction reaction. Its indication denotes that the smaller the value, the more powerful is the antioxidant.

As is clear from the above results, the synthesized wine without addition of any antioxidant deteriorated in flavour within 5 days after mixing, while all those containing an antioxidant showed no change. Among them, especially the one which contained kojic acid retained the flavour most perfectly, maintaining the lowest ITT value, so to prove that this one was the most resistant to flavour deterioration during the subsequent storage, and also most stable in quality. The amount of kojic acid to be added has been determined by experiments to be generally from 0.0001 to 0.1% or preferably 0.005 to 0.01 percent by weight of the wine.

The addition should generally be effected immediately after the first clarification or a few days before mixing the fermented wine with the synthesized wine. But partial additions of the same total amount as above in several separate portions at various stages of the preparation will also provide a good result. The kojic acid is preferably added to a small quantity of tepid water, then mixed and gently agitated so that it will dissolve uniformly.

The following examples are given to illustrate the process and the details of this present invention.

EXAMPLE 1

0.005% of kojic acid by weight was added and dissolved in a white wine prepared from the Delaware species of Japanese grape, immediately after the first clarification. After storage in an oak cask for 12 months after clarification, a superior product having a fragrant and stabilized flavour was obtained, and the potential of this wine was rH 16.4.

Another portion of the same wine, as a control, was stored in exactly the same way as above but to which no kojic acid was added slightly browned in colour. The potential was as high as rH 25.2. The flavour was deteriorated.

A still large effect was witnessed in this example when ca. 0.004% more of kojic acid was added after the third clarification in addition to the 0.005% originally added.

EXAMPLE 2

0.008% of kojic acid by weight was added to and dissolved in a clarified red wine prepared from the Adirondack species of grape.

Stored in an oak cask for 10 months after the clarification, a superior product having a good flavour and a deep red colour was obtained, the potential of which was rH 15.3.

The red wine prepared, however, without the addition of kojic acid discolored, sometimes becoming brown. The potential was rH 24.5 and the flavour was markedly deteriorated.

EXAMPLE 3

A wine synthesized by blend of alcohol, sugars, tartaric acid, amino acids, tannin, inorganic salts, colours and various seasonings, etc., was mixed with a new natural fermented white wine prepared from the Koshu species of grape after its primary fermentation. A few days prior to mixing 15% of the new wine, however, kojic acid had been added to the synthetic wine so that the final concentration would be 0.01%. The ITT values were measured and the change of flavour was also tested at regular intervals after the mixing. The results obtained are shown in the following table, in which the ITT values are represented by the time (minutes) required until the indicator used has been discoloured by 20%.

kojic acid was slow, and even if a sudden increase of potential had occurred, a marked decrease was subsequently seen and thereafter an extremely slow increase followed, not causing deterioration of flavour.

The above descriptions may be summarized as signifying that a rapid increase of oxidation-reduction potential and the continuation of such increase cause the deterioration of flavour and, especially, such phenomena are caused by a potential increase of as much as rH 20, because of the excessive oxidation during the storage for maturation.

Such deterioration as described above may be substantially prevented by adding a small amount of kojic acid.

EXAMPLE 4

0.005% of kojic acid was added to and dissolved in a clarified apple wine prepared from the Kogyoku species of apple, and the wine thus treated was filtered, stored and matured. A superior product having a characteristic flavour was obtained.

The potential as well as the ITT value of the wine to which no kojic acid was added increased and the flavour deteriorated.

EXAMPLE 5

In the brewing of light beer from the Golden Melon species of barley, 0.004% of kojic acid was added to and dissolved in a mash after the completion of the main fermentation.

Following the after-fermentation of three months, 0.004% of kojic acid by weight was again added and dissolved in the mash just before the filtration.

And when bottling, after pasteurization and storage for eight months were over, a product having an excellent

TABLE II

*Effect of Kojic Acid on Taste Stability in Relation to Its ITT Value (Minutes)*

| | Days after the mixing | | | | | | | | | Result of tasting |
|---|---|---|---|---|---|---|---|---|---|---|
| | 0 | 1 | 2 | 4 | 8 | 18 | 30 | 51 | 85 | |
| Sample (Kojic acid added) | 23 | 19 | 12 | 8 | 7 | 13 | 15 | 15 | 16 | Not deteriorated flavor, superior quality. |
| Control (Kojic acid not added) | 198 | 207 | 220 | 235 | 240 | 250 | 250 | 260 | 270 | Deterioriated flavor within 5 days, inferior quality. |
| Synthetic wine | 280 | | | 280 | | | | | 280 | |
| New wine (natural fermented) | 22 | | | 22 | | 25 | 30 | 43 | 62 | |

As is apparent from the above figures, the ITT value of the control (no kojic acid added) rapidly increased from 22 minutes, the value of new wine, to 198 minutes, showing no further tendency of decreasing at all, so that the buffer action against the oxidation reduction potential, i.e. the stabilizing power against oxidation, was quite weak, and the flavour was unstable, and even with a slight oxidizing action, the potential rapidly increased, giving a product of deteriorated flavour and inferior quality.

Whereas with respect to the sample to which kojic acid was added, though the ITT value indicated a little increase at first, it rather decreased for a few days thereafter, followed by a very slow increase and finally a very low value could be observed. This fact shows that the buffer action of this sample wine against increase of oxidation reduction potential, i.e. stabilizing power against oxidation, was quite strong, and, therefore, a product having stable flavour and superior quality can be obtained in this manner.

Similarly as with the ITT values, the oxidation-reduction potentials of the control (no kojic acid was added) rapidly increased immediately after the mixing of new wine, from rH 9.1 to rH 16.0, then followed a continuous increase for about 15 to 20 days, reaching rH 19.0, which is nearly equal to the oxidation-reduction potential of the synthetic wine, rH 19.1, so causing a deterioration of flavour. On the other hand, the rate of oxidation-reduction potential increase in the sample wine treated with flavour of beer was obtained. The potential was only rH 11.2.

Whereas, the beer which had been treated in the same way but without the addition of kojic acid, as control, coloured a little dark and the flavour became worse once the potential rose to rH 18.5.

I claim:

1. The method of preventing oxidation deterioration in alcoholic beverages of the group consisting of natural fermented and synthetic wines and beer which consist in adding to said beverage kojic acid in the amount of 0.0001 to 0.1 percent by weight of the beverage.

2. The method of preventing oxidation deterioration in an alcoholic beverage consisting of a mixture of a natural fermented wine with a synthetic wine which consists in adding to said beverage kojic acid in the amount of 0.0001 to 0.1 percent by weight of the beverage.

3. The method of preventing oxidation deterioration in an alcoholic beverage consisting of a natural fermented wine which consists in adding to said beverage kojic acid in the amount of 0.0001 to 0.1 percent by weight of the beverage.

4. The method of claim 3 said natural fermented wine being grape wine.

5. The method of claim 3 said natural fermented wine being apple wine.

6. The method of preventing oxidation deterioration in an alcoholic beverage consisting of beer which consists in adding to said beverage kojic acid in the amount of 0.0001 to 0.1 percent by weight of the beverage.

References Cited in the file of this patent

UNITED STATES PATENTS

| 2,159,985 | Gray et al. | May 30, 1939 |
| 2,948,616 | Kinsman et al. | Aug. 9, 1960 |

OTHER REFERENCES

Beelik, A.: "Kojic Acid" in "Advances in Carbohydrate Chemistry," vol. 11 (1956), pp. 145–183, page 182 relied on.

Cook: Dissertion Abstract, vol. 19, 1958, p. 1165; Chemical Abstracts; vol. 53, 1959, p. 5413(a); "Influence of Metallic Ion Environment on Growth of Yeast and on Antimicrobial Activity of Juglone and Kojic Acid."